M. DÜRR.
ELECTRICAL INSTRUMENT FOR ELECTRICALLY TRANSMITTING INDICATIONS.
APPLICATION FILED AUG. 26, 1913.
1,146,486.
Patented July 13, 1915.
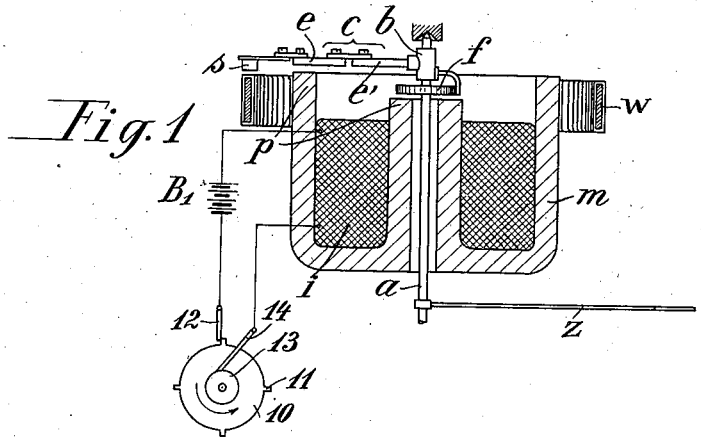
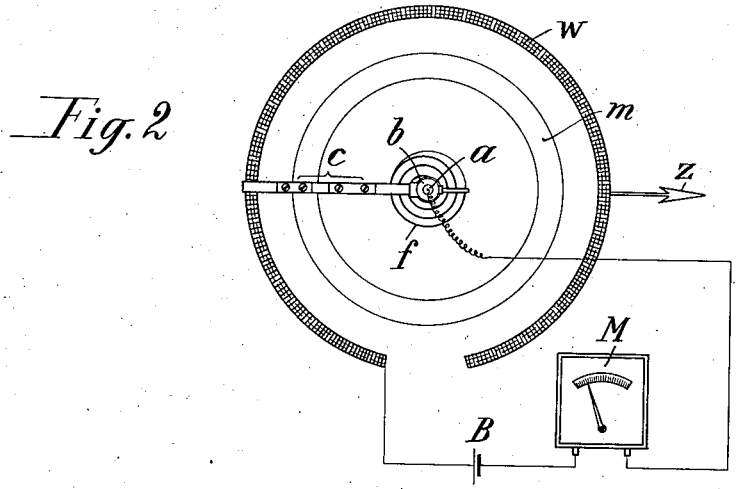
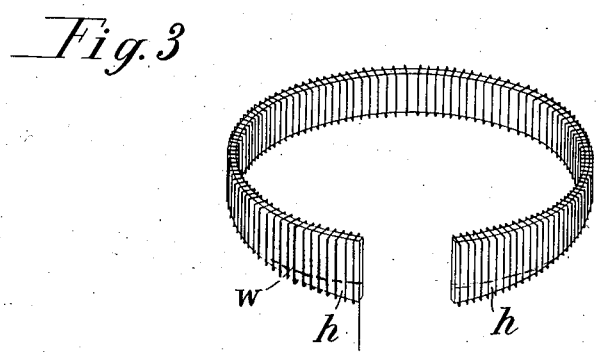

UNITED STATES PATENT OFFICE.

MAX DÜRR, OF FRIEDENAU, NEAR BERLIN, GERMANY, ASSIGNOR TO SIEMENS & HALSKE A. G., OF BERLIN, GERMANY, A CORPORATION OF GERMANY.

ELECTRICAL INSTRUMENT FOR ELECTRICALLY TRANSMITTING INDICATIONS.

1,146,486.  Specification of Letters Patent.  Patented July 13, 1915.

Application filed August 26, 1913. Serial No. 786,701.

*To all whom it may concern:*

Be it known that I, MAX DÜRR, a subject of the German Emperor, and a resident of Friedenau, near Berlin, Germany, have invented certain new and useful Improvements in Electrical Instruments for Electrically Transmitting Indications, of which the following is a full, clear, and concise description.

My invention relates to an electrical measuring instrument which is especially used in connection with instruments having their pointers mechanically operated, such as manometers, the indication of which shall be electrically transmitted upon an electrical measuring instrument, preferably one of the registering type. Ordinarily in this case the pointer whose position is to be transmitted is moving over a series of contacts into which resistances are inserted so that according to the number of contacts switched into circuit the value indicated at an indicating or integrating instrument will measure the deflection of the pointer. Arrangements of this kind have generally the disadvantage that the grading of the resistance varied by the pointer, and consequently the indications obtained at the electrical measuring instrument are rather inaccurate, especially if the scale of the instrument whose indication shall be transmitted is non-uniform as often found in practice. By my invention this disadvantage is obviated by arranging the aforesaid resistance upon an insulating body of the shape of a ring following the direction of movement of the pointer, the resistance being mounted upon said ring and being made up by closely adjacent turns upon which the pointer is moving by means of a contact member having a dull or broad edge. Thus, the pointer or contact member will be contacting in every moment with a plurality of adjacent turns of the resistance, this arrangement permitting a transmission of even very small motions of the pointer upon the indicating device. In the scale of the instrument whose motions are to be registered, for instance of a manometer, by the apparatus according to my invention there may yet be entirely proportionate deflections of the registrating instrument attained, in such a manner that the cross-section of the insulating body carrying the resistance turns is made non-uniform, and this in dependence from the non-uniformity of the scale of said first instrument so that the amount of resistance inserted between adjacent contacts varies according to the circumference of the variable cross section of the insulating body.

In order, now, to do away with the mechanical resistance of the contact which is an impediment for the free motion of the pointer, I provide means for making the contact periodically and only for a short time, so that the registration at the integrating instrument will present itself as an interrupted line. This may be done in such a way that the contact arm is depressed either mechanically by a clip or lever which is actuated in regular intervals, or also electrically by periodically exciting an electromagnet which depresses said contact arm in proper intervals by electro-magnetic attraction. As such pointer instruments are often employed in moist rooms the resistance wire as well as the contact coöperating therewith are preferably made from non-oxidizing metals or their alloys.

In the drawing forming part of this specification I have shown an embodiment of my invention of which—

Figure 1 is a longitudinal section of an instrument according to my invention. Fig. 2 a plan view of the same instrument, and Fig. 3 a front view of the resistance body of the construction shown in Figs. 1 and 2.

Referring now more particularly to the drawing, the pointer $z$, for instance of a manometer, is mounted upon an axle $a$ which is coupled by a spring $f$ with the central part $b$ of the pointer $c$. This pointer $c$ is made of resilient material, and is provided at its end with an edge-like contact preferably made from an alloy of gold and silver or from platinum. For being depressed upon the resistance, iron pieces $e$ and $e'$ are attached to the under side of the pointer, which are attached at intervals by an electro-magnet as described below. The contact edge $s$ during motion of the pointer $z$ moves over a resistance body $w$ consisting of a wire wound upon an insulating body having the form of a ring open at one place. The insulation of this resistance wire, which is also preferably made from non-oxidizing metals or alloys thereof, is removed at the upper part of the surface contacting with the edge s, so that a good contact is obtained. Concentrically with the axle a there is provided a pot-shaped magnet m whose poles p are bridged by the iron bodies e and e' which are fastened upon the contact arm c. As soon as current is sent through the winding i of this magnet, which may be done periodically, such as by a clock work, this magnet will attract the armature e, therewith pressing the contact edge s upon the resistance body w, thus making temporarily a circuit from the battery B over the registering instrument M, which is then connected in circuit with the contact arm c. An arrangement of the latter kind I have incorporated in Fig. 1 by a wheel 10 which is provided with a number of projections or teeth 11 and which is rotated, as indicated by the arrow, by a clock work or similar device so that at even intervals a circuit will be established for exciting the winding i of the electro-magnet m by the battery $B_1$ over the contact spring 12 and the slip-ring 13 and brush or contact-spring 14, as shown in Fig. 1 of the drawing. Also, according to the position of the pointers z and c, a current will flow through the instrument M, said current depending upon the amount of resistance, which is at the time included in the circuit of the battery B. This, obviously will cause an indication or registration at the instrument M corresponding to the angle of deflection of the pointer z.

When employing a registering instrument M, integrating periodically such as by means of a fall lever, the operation of the current closing device of the magnet m is so timed that the excitation of this magnet will take place in the same moment in which the pointer of the registering instrument is kept depressed by the fall lever.

In order to compensate the non-uniformity of the scale, the insulating body carrying the resistance is made with a larger cross-section at its ends, as indicated at h, so that at these places there will correspond to the same angle of deflection of the arm c a greater change of resistance than at other places of the resistance body. This change in cross-section of the insulating body which is shown as an increase of cross-section at the ends of the ring may of course be different from that shown in the drawing and may be closely adapted to the particular degree of non-uniformity throughout the scale of any instrument. In this manner I attain that the indications at the measuring instrument M will be made to follow a uniform scale, whatever be the degree of non-uniformity of the scale of the first instrument, that is to say of the deflection of the pointer z.

Having thus described my invention, I claim as new and desire to secure by Letters Patent of the United States:—

1. In an electrical instrument for electrically transmitting indications by changes of resistance, the combination of a ring-shaped insulating body wound with resistance wire in closely adjacent turns, the cross-section of said insulating body being such as to compensate non-uniformity in the deflections of said instrument, and a device contacting with said resistance wire and carried by the pointer of said instrument.

2. In an electrical instrument for electrically transmitting indications by changes of resistance, the combination of a ring-shaped insulating body wound with resistance wire in closely adjacent turns, a contact arm for making contact with said resistance wire, said contact arm being mounted resiliently and carried by the pointer of said instrument, and means for depressing said contact arm at intervals upon said resistance wire for making circuit with an electrical measuring device.

3. In an electrical instrument for electrically transmitting indications by changes of resistance, the combination of a ring-shaped insulating body which is wound with resistance wire in closely adjacent turns, a contact arm normally at some distance from said resistance wire and carried by the pointer of said instrument, and electro-magnetic means for bringing said contact arm in contact with said resistance wire for making circuit with an electrical measuring device.

4. In an electrical instrument for electrically transmitting indications by changes of resistance, the combination of a ring-shaped insulating body which is wound with resistance wire in closely adjacent turns, a contact arm for contacting with said resistance wire resiliently carried by the pointer of said instrument, and electro-magnetic means for periodically bringing said contact arm in contact with said resistance wire.

In testimony whereof I have hereunto set my signature in presence of two subscribing witnesses.

MAX DÜRR.

Witnesses:
HENRY HASPER,
ARTHUR SCHROEDER.